(12) United States Patent
Piras et al.

(10) Patent No.: US 11,083,325 B2
(45) Date of Patent: Aug. 10, 2021

(54) MODULAR MACHINE FOR PREPARING BEVERAGES FROM CAPSULES

(71) Applicant: ILLYCAFFE' S.P.A. CON UNICO SOCIO, Trieste (IT)

(72) Inventors: Riccardo Piras, Monza (IT); Furio Suggi Liverani, Trieste (IT); Eleuterio Proia, Gradisca d'Isonzo (IT); Maurizio Gasparin, Pordenone (IT); Cosimo Fusco, Trieste (IT)

(73) Assignee: ILLYCAFFE' S.P.A. CON UNICO SOCIO, Trieste (IT)

(*) Notice: Subject to any disclaimer, the term of this patent is extended or adjusted under 35 U.S.C. 154(b) by 590 days.

(21) Appl. No.: 15/578,215

(22) PCT Filed: May 30, 2016

(86) PCT No.: PCT/EP2016/062185
§ 371 (c)(1),
(2) Date: Nov. 29, 2017

(87) PCT Pub. No.: WO2016/193223
PCT Pub. Date: Dec. 8, 2016

(65) Prior Publication Data
US 2018/0146817 A1 May 31, 2018

(30) Foreign Application Priority Data
May 29, 2015 (IT) .......................... UB2015A001060

(51) Int. Cl.
*A47J 31/36* (2006.01)
*A47J 31/46* (2006.01)

(52) U.S. Cl.
CPC ......... *A47J 31/3623* (2013.01); *A47J 31/465* (2013.01); *A47J 2201/00* (2013.01)

(58) Field of Classification Search
CPC .. A47J 31/465; A47J 2201/00; A47J 31/4403; A47J 31/56; A47J 31/30;
(Continued)

(56) References Cited

U.S. PATENT DOCUMENTS 5,901,634 A * 5/1999 Vancamp .............. A47J 31/002
99/281
5,927,553 A * 7/1999 Ford ...................... A47J 31/401
222/129.4

(Continued)

FOREIGN PATENT DOCUMENTS

CH   682798 A5   11/1993
EP   0 761 150 A1   3/1997
(Continued)

OTHER PUBLICATIONS

International Search Report and Written Opinion for PCT/EP2016/062185, dated Aug. 5, 2016.

*Primary Examiner* — Sarang Afzali
(74) *Attorney, Agent, or Firm* — Marshall, Gerstein & Borun LLP (57) ABSTRACT

Modular machine for preparing beverages from capsules, including a unit to supply electric and hydraulic services and a plurality of modules for the automatic preparation of beverages from capsules, each electrically and hydraulically autonomous with respect to every other module. The modules are respectively connected by means of an electric circuit and a hydraulic circuit to a single outlet electric connector and to an outlet hydraulic collector of the unit to supply electric and hydraulic services.

30 Claims, 3 Drawing Sheets

(58) Field of Classification Search
CPC .. A47J 31/46; A47J 31/10; A47J 31/24; A47J 31/4482; A47J 31/0642; A47J 31/0626; A47J 31/0647; A47J 31/407; A47J 31/0668; A47J 31/40; A47J 31/36; Y10T 29/49; Y10T 29/49002; Y10T 29/49826
USPC ......... 99/280, 281, 284, 285, 288, 293, 295, 99/300
See application file for complete search history.

(56) References Cited

U.S. PATENT DOCUMENTS

| | | | | |
|---|---|---|---|---|
| 6,029,562 A | * | 2/2000 | Sintchak | A47J 31/4403 220/4.02 |
| 2009/0095729 A1 | | 4/2009 | Dyson et al. | |

FOREIGN PATENT DOCUMENTS

| | | |
|---|---|---|
| EP | 1 046 366 A1 | 10/2000 |
| EP | 1 864 598 A1 | 12/2007 |
| EP | 2 474 254 A1 | 7/2012 |
| FR | 2 544 185 A3 | 10/1984 |
| WO | WO-2011/135479 A1 | 11/2011 |

* cited by examiner

MODULAR MACHINE FOR PREPARING BEVERAGES FROM CAPSULES

FIELD OF THE INVENTION

Embodiments described here concern a modular machine for preparing beverages from capsules or cartridges, containing a powdered substance, for example for preparing coffee, in particular espresso coffee, or other beverages.

Hereafter we will describe, merely by way of example, the preparation of coffee, but the description can also be applied to tea, cocoa, chocolate, milk or other substances in themselves, either to be integrated with each other or with coffee or with tea, and/or with another substance according to the function to which the beverage is intended and the specific requirements of an operator or consumer.

BACKGROUND OF THE INVENTION

It is known to prepare coffee beverages, in particular espresso coffee, using powdered coffee obtained by grinding coffee beans. Coffee beverages, hereafter also called simply coffee, are generally obtained by extraction, i.e. percolation with boiling and pressurized water.

In particular, it is known to use machines to produce coffee using capsules or cartridges containing the powdered coffee. The capsules can be made for example of metal, plastic, biodegradable plastic or other biodegradable or compostable materials, such as for example polylactic acid (PLA).

In general, the passes to extract the coffee based beverage from an espresso coffee machine comprise a step in which hot water, or pressurized steam, is introduced into an extraction chamber, a step of infusing the coffee with the hot water or pressurized steam, and a step of delivering the beverage thus obtained into a collection container, for example a mug, a cup, glass or other suitable container, so that it is ready to be drunk.

One disadvantage of known machines for preparing coffee is that the capsules must be introduced manually, for every operation to deliver the coffee, inside an extraction chamber. That is, for every preparation of a dose of coffee, a respective capsule has to be introduced manually into the machine.

After the delivery of the coffee, moreover, the used capsules have to be removed and eliminated, and this too is normally done manually.

This prevents a continuous, fast use of the machines, because the operations to load and discharge the capsules take a certain time.

Another disadvantage of these machines is that they can have problems when capsules are used that have to be inserted into the extraction chamber in a particular insertion direction.

One attempt to control the insertion direction can be made with shaped guide or lead-in members, associated with the extraction chamber. However, when it becomes necessary to use the machines continuously, for example when a series of coffees has to be prepared quickly in a commercial business, it may happen that the operator does not pay due attention and problems may arise of blockage and jamming, and the preparation is not correct.

Moreover, there is a growing diffusion of capsules for preparing coffee containing different proportions of different types or varieties of coffee in the powdered mixture, which influence the organoleptic properties of the coffee prepared with them, such as the taste, aroma, acidity and body.

Coffee enthusiasts or lovers can detect even minimum variations in the organoleptic properties, which can influence their judgment of the beverage and their choice or preference of one mixture of powdered coffee obtained by grinding a certain selection of coffee beans of different types rather than another.

Each of these coffee enthusiasts or lovers can therefore prefer a different type of coffee, and so it may happen that in a commercial business different clients can ask for a specific type of coffee, so the operator has to load the machines to prepare the coffee every time with a specific capsule. Especially when it is necessary to prepare the coffees quickly, this can lead to a bigger work load for the operators, and therefore they not only have to pay attention to inserting the capsules, but must also correctly select, on each occasion, the capsule relating to the specific mixture requested by each client.

Document WO-A-2011/135479 describes a modular machine for producing different beverages, and is formed by a base module and auxiliary modules disposed simply alongside and adjacent to each other. The base module is provided with a tank for the water, a boiler for the water, a pump, a control unit, a user interface and a coffee delivery unit. The auxiliary modules are provided to perform different functions and therefore are different modules. The auxiliary modules include a module to prepare iced coffee, a module to generate hot water or steam, a module to prepare an Americano, a module to house the beverage to keep the beverage hot, and a module to prepare a beverage from a pod, capsule or suchlike. An electric and hydraulic interconnection is provided between the base module and the auxiliary modules and also between the auxiliary modules themselves. However, this has the disadvantage that, if one of the auxiliary modules is removed or malfunctions, it prevents the operations at least of the modules connected to the removed or malfunctioning module, or the module downstream, compromising the operations of all or part of the machine.

Document EP-A-1.046.366 describes a single machine for preparing coffee using capsules of a known type.

Document EP-A-0.761.150 describes a single machine for preparing coffee with module components.

Document EP-A-2.474.254 describes a single machine for preparing coffee provided with an auxiliary unit for delivering hot milk or milk froth.

Document EP-A-1.864.598 describes a device for producing beverages of the module type, provided with a base docking station and a beverage production module suitable to be put selectively into a connected and disconnected state respectively with the docking station. The beverage production module is able to produce the beverage from ingredients contained in a capsule and, in the disconnected state it is therefore hydraulically and electrically autonomous to produce the beverage. The docking station and the module are provided with respective control circuits configured to organize the docking station and the module hierarchically in accordance with the master-slave principle. In particular, the control circuit of the module is designed for an autonomous control of the module, in the disconnected state, while the control circuit of the docking station is designed to take at least partial control of the module, in the connected state, defining a master-slave configuration.

Document FR-A-2.544.185 describes a machine for preparing espresso coffee formed by modules disposed simply alongside and adjacent, connected in series hydraulically and/or electrically. However, one disadvantage is that, with this type of connection between the modules, a malfunction of one of the modules implies that at least the modules downstream are unable to operate.

There is therefore a need to perfect a modular machine for preparing beverages from capsules that can overcome at least one of the disadvantages of the state of the art.

In particular, one purpose of the present invention is to obtain a modular machine for preparing beverages in which it is not necessary to insert the capsules manually inside the extraction chamber of a machine for preparing coffee or other beverages with every single operation to deliver coffee.

Another purpose of the present invention is to obtain a modular machine for preparing beverages which is able to automatically discharge the used capsule, without obliging the operator to remove it before being able to perform a new operation to deliver the coffee or other beverage.

Another purpose of the present invention is to obtain a modular machine for preparing beverages from capsules which is easily scalable, easily managed and which allows to intervene, in the case of maintenance, installation and/or repairs, easily and quickly, reducing the downtimes of the machine.

Another purpose of the present invention is to obtain a modular machine which is simple to use and which, for use, does not require particular knowledge of machines for preparing beverages that use capsules.

Other limitations and disadvantages of conventional solutions and technologies will be clear to a person of skill after reading the remaining part of the present description with reference to the drawings and the description of the embodiments that follow, although it is clear that the description of the state of the art connected to the present description must not be considered an admission that what is described here is already known from the state of the prior art.

The Applicant has devised, tested and embodied the present invention to overcome the shortcomings of the state of the art and to obtain these and other purposes and advantages.

SUMMARY OF THE INVENTION

The present invention is set forth and characterized in the independent claim, while the dependent claims describe other characteristics of the invention or variants to the main inventive idea.

In accordance with some embodiments a modular machine for preparing beverages from capsules is provided.

According to one embodiment, the modular machine comprises a unit to supply electric and hydraulic services and a plurality of modules for the automatic preparation of beverages from capsules that are equal to each other, each of which is in itself without its own electric and hydraulic feed and is respectively removably connected to an electric circuit and to a hydraulic circuit respectively connected to a single outlet electric connector and to an outlet hydraulic collector of the unit to supply electric and hydraulic services, so that each module is electrically and hydraulically connected to said unit to supply electric and hydraulic services, each module being electrically and hydraulically autonomous with respect to every other module.

According to some embodiments, the modular machine comprises a single frame that positions the unit to supply electric and hydraulic services and at least one of the modules, disposed adjacent to each other in a direction of alignment transverse to an operating direction, along which the modules are accessible.

In accordance with a variant, the electric circuit and the hydraulic circuit are at least partly supported by the single frame.

According to some embodiments, each of the modules comprises a capsule feed tank, a beverage delivery unit and a discharge tank to receive the used capsules.

According to other embodiments the unit to supply electric and hydraulic services comprises a device to feed electric energy configured to supply electric power to each of the modules for the automatic preparation of beverages from capsules and a unit to feed water configured to supply water to each of the modules for the automatic preparation of beverages from capsules.

According to other embodiments, each of the modules comprises at least an inlet electric connector and an inlet hydraulic socket to connect respectively to the electric circuit and the hydraulic circuit.

According to some embodiments, the electric circuit comprises a plurality of electric connections, each with an electric connector at its end, so as to be able to connect on one side to an automatic preparation module of beverages from capsules, and on the other side to the unit to supply electric and hydraulic services.

According to a variant, the single frame supports and positions the electric connectors of the electric circuit, so that they are connectable with the respective inlet electric connectors of the modules for the automatic preparation of beverages from capsules.

According to some embodiments, the hydraulic circuit comprises a plurality of hydraulic connections, each with a hydraulic socket at its end, to be able to connect on one side to a module for the automatic preparation of beverages from capsules and on the other side to the unit to supply electric and hydraulic services.

According to another variant, the single frame supports and positions the hydraulic sockets of the hydraulic circuit, so that they are connectable with the respective hydraulic inlet sockets of the modules for the automatic preparation of beverages from capsules, or to the inlet hydraulic connector of the unit to supply electric and hydraulic services.

In this way, according to the present invention, advantageously, each module is electrically, hydraulically and mechanically independent with respect to each of the other modules. Therefore, even if there is a malfunction or removal of one of the modules, the working of the other modules is not impeded, since these derive their electric and hydraulic feed directly from the unit to supply electric and hydraulic services, by means of the electric and hydraulic circuits.

Moreover, if a single module does not function correctly, this can be easily disconnected and/or reconnected to the unit to supply electric and hydraulic services, interrupting, at most only for a moment, the functioning of the modular machine.

Other embodiments concern a method to make a modular machine for preparing beverages from capsules. In accordance with one embodiment the method comprises:
  supplying a unit to supply electric and hydraulic services;
  supplying a plurality of modules for the automatic preparation of beverages from capsules that are equal to each other, each of which is in itself without its own electric and hydraulic feed;
  removably connecting each module to an electric circuit and to a hydraulic circuit connected respectively to a single outlet electric connector and to an outlet hydraulic collector of the unit to supply electric and hydraulic services so that each module is electrically and hydraulically connected to the unit to supply electric and hydraulic services, each module being electrically and hydraulically autonomous with respect to every other module.

These and other aspects, characteristics and advantages of the present disclosure will be better understood with reference to the following description, drawings and attached claims. The drawings, which are integrated and form part of the present description, show some forms of embodiment of the present invention, and together with the description, are intended to describe the principles of the disclosure.

The various aspects and characteristics described in the present description can be applied individually where possible. These individual aspects, for example aspects and characteristics described in the attached dependent claims, can be the object of divisional applications.

It is understood that any aspect or characteristic that is discovered, during the patenting process, to be already known, shall not be claimed and shall be the object of a disclaimer.

BRIEF DESCRIPTION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

We shall now refer in detail to the various embodiments of the present invention, of which one or more examples are shown in the attached drawing. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Before describing these embodiments, we must also clarify that the present description is not limited in its application to details of the construction and disposition of the components as described in the following description using the attached drawings. The present description can provide other embodiments and can be obtained or executed in various other ways. We must also clarify that the phraseology and terminology used here is for the purposes of description only, and cannot be considered as limitative. The use of terms such as "including", "comprising", "having" and their variations is intended to include the elements listed after them and their equivalents, and also additional elements. Unless otherwise specified, terms such as "mounted", "connected", "supported" and "coupled" and their variations are used in the widest sense and include both direct and indirect assemblies, connections, supports and couplings. Furthermore, the terms "connected" and "coupled" cannot be limited to physical or mechanical connections or couplings.

Embodiments described here concern a modular machine 10 for preparing coffee, in particular, but not restrictively, espresso coffee or other beverages, which uses capsules or cartridges containing a powdered substance from which, by means of hot extraction or infusion, i.e. percolation with hot water and/or pressurized steam, the desired beverage is obtained. Examples of other beverages, apart from coffee, can be coffee to which other substances, extracts or vegetable preparations have been added, such as for example ginseng coffee, or tea, chocolate, tisanes, infusions, for example of herbs, fruits or other vegetables, milk or similar or comparable food products to be consumed in the form of a beverage, or combinations thereof. The capsules can be made for example of metal, plastic, biodegradable plastic or other biodegradable or compostable materials, such as for example polylactic acid (PLA).

FIGS. 1-4 are used to describe embodiments, combinable with all the embodiments described here, of a modular machine 10 that comprises a plurality of modules 12 for the automatic preparation of beverages from capsules and a unit to supply electric and hydraulic services 16 which can be connected to and serve each of the modules 12 for the automatic preparation of beverages from capsules.

According to some embodiments, the modules 12 for the automatic preparation of beverages from capsules are equal to each other and moreover each of them is in itself without its own electric and hydraulic feed. Advantageously, the modules 12 for the automatic preparation of beverages from capsules receive, autonomously from each other, the hydraulic and electric feed directly from the unit to supply electric and hydraulic services 16. It is therefore possible to disconnect or remove, according to necessity, one of the modules 12 for the automatic preparation of beverages from capsules, keeping the others operative.

The modular machine 10 also comprises an electric circuit 18 and a hydraulic circuit 20, which respectively connect each module 12 for the automatic preparation of beverages from capsules to the unit to supply electric and hydraulic services 16. Each of the modules 12 for the automatic preparation of beverages from capsules is therefore removably connected to the electric circuit 18 and the hydraulic circuit 20. Advantageously, therefore, each module 12 for the automatic preparation of beverages from capsules is electrically and hydraulically connected to the unit to supply electric and hydraulic services 16, since each module 12 for the automatic preparation of beverages from capsules is electrically and hydraulically autonomous with respect to each other module 12 for the automatic preparation of beverages from capsules.

In some embodiments of the modular machine 10, a single frame 14 is also provided, which positions, disposed adjacent to each other in a direction of alignment L, at least the modules 12 for the automatic preparation of beverages from capsules and the unit to supply electric and hydraulic services 16.

Furthermore, advantageously the electric circuit 18 and the hydraulic circuit 20 are supported at least partly by the single frame 14, as explained in more detail hereafter in the description.

The modules 12 for the automatic preparation of beverages from capsules can be positioned in direct contact with each other, or slightly distanced from each other.

Furthermore, at least one of the modules 12 for the automatic preparation of beverages from capsules can be directly adjacent to the unit to supply electric and hydraulic services 16.

According to some embodiments, the direction of alignment L is horizontal, therefore the modules 12 for the automatic preparation of beverages from capsules are adjacent to each other horizontally.

Each module 12 for the automatic preparation of beverages from capsules is accessible frontally in an operating direction F, transverse with respect to the direction of alignment L.

The modules 12 for the automatic preparation of beverages from capsules can all face the same way, or it can be provided that one or more of them face the opposite side.

The modular machine 10 can also comprise a cover 22, configured to contain inside it at least the unit to supply electric and hydraulic services 16 and the modules 12 for the automatic preparation of beverages from capsules.

The cover 22 can be shaped so as to have smooth surfaces, cantilevered, concave, convex, or a combination thereof, to confer a particular esthetics on the modular machine 10.

Figure 1:
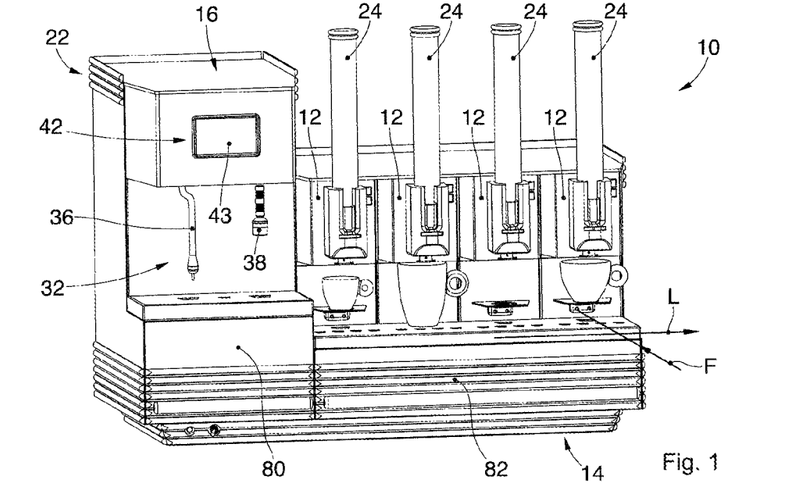
FIG. 1 is a front perspective view of a modular machine for preparing beverages from capsules in accordance with embodiments described here.
Figure 2:
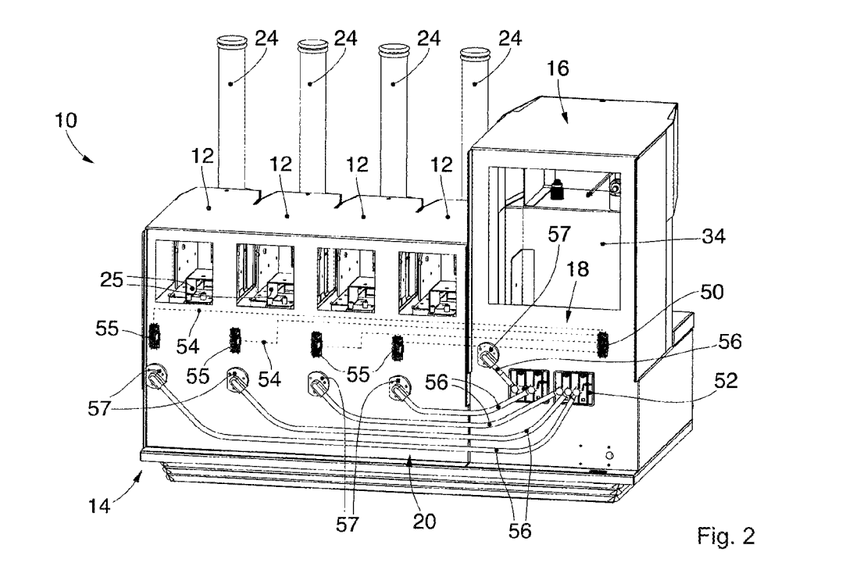
FIG. 2 is a rear perspective view of a modular machine for preparing beverages from capsules in accordance with embodiments described here.

According to embodiments described using FIGS. 1 and 2, four modules 12 for the automatic preparation of beverages from capsules can be provided, but there is nothing to prevent the number of modules 12 for the automatic preparation of beverages from capsules from being for example two, three, five or more than five, for example six, seven or eight.

Figures 6, 7, 8:
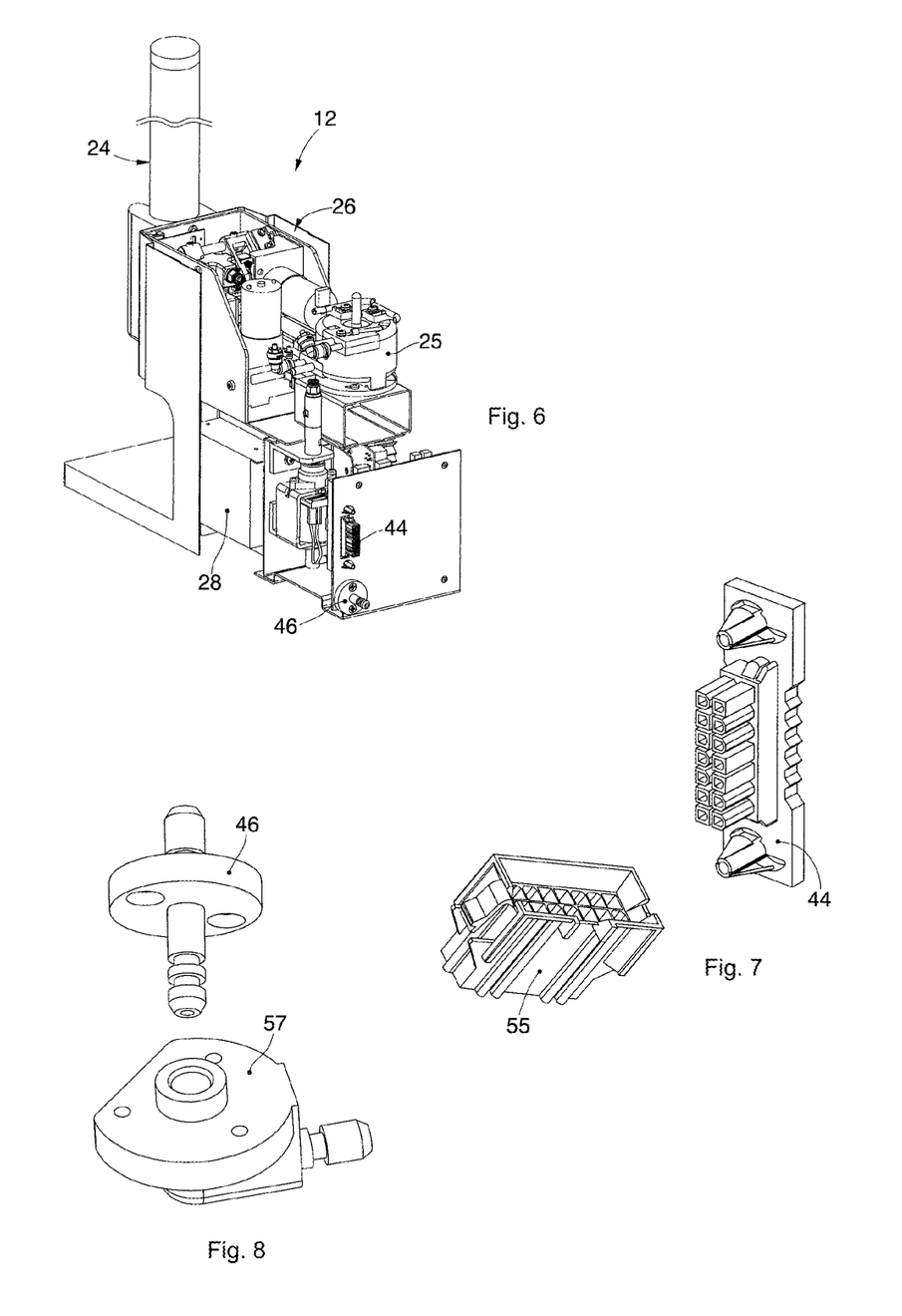
FIG. 6 is a perspective view of a module of the modular machine for preparing beverages from capsules in accordance with embodiments described here.
FIG. 7 is a detail of the modular machine for preparing beverages from capsules in FIG. 2.
FIG. 8 is a detail of the modular machine for preparing beverages from capsules in FIG. 2.

According to embodiments described using FIG. 6, a module 12 for the automatic preparation of beverages from capsules comprises a capsule feed tank 24, a beverage delivery unit 26 and discharge tank 28 to receive the used capsules.

Each capsule feed tank 24 can advantageously be filled with capsules containing a specific mixture of coffee, so that a number of capsules is always available, containing different mixtures equal to the number of modules 12 for the automatic preparation of beverages from capsules present in the modular machine 10.

According to embodiments described using FIG. 2, each module 12 for the automatic preparation of beverages from capsules can be provided with a heating device, also called heating block 25, configured to heat the water to the temperature needed for the percolation of a beverage, in particular for preparation of the coffee by extraction, with hot water and/or steam.

Each module 12 for the automatic preparation of beverages from capsules, for example, can consist of an automated device for preparing beverages from capsules according to the content of the application for a patent of industrial invention n. UD2015A000036 filed in Italy on Mar. 17, 2015 in the name of the present Applicant.

Figures 3, 4, 5:
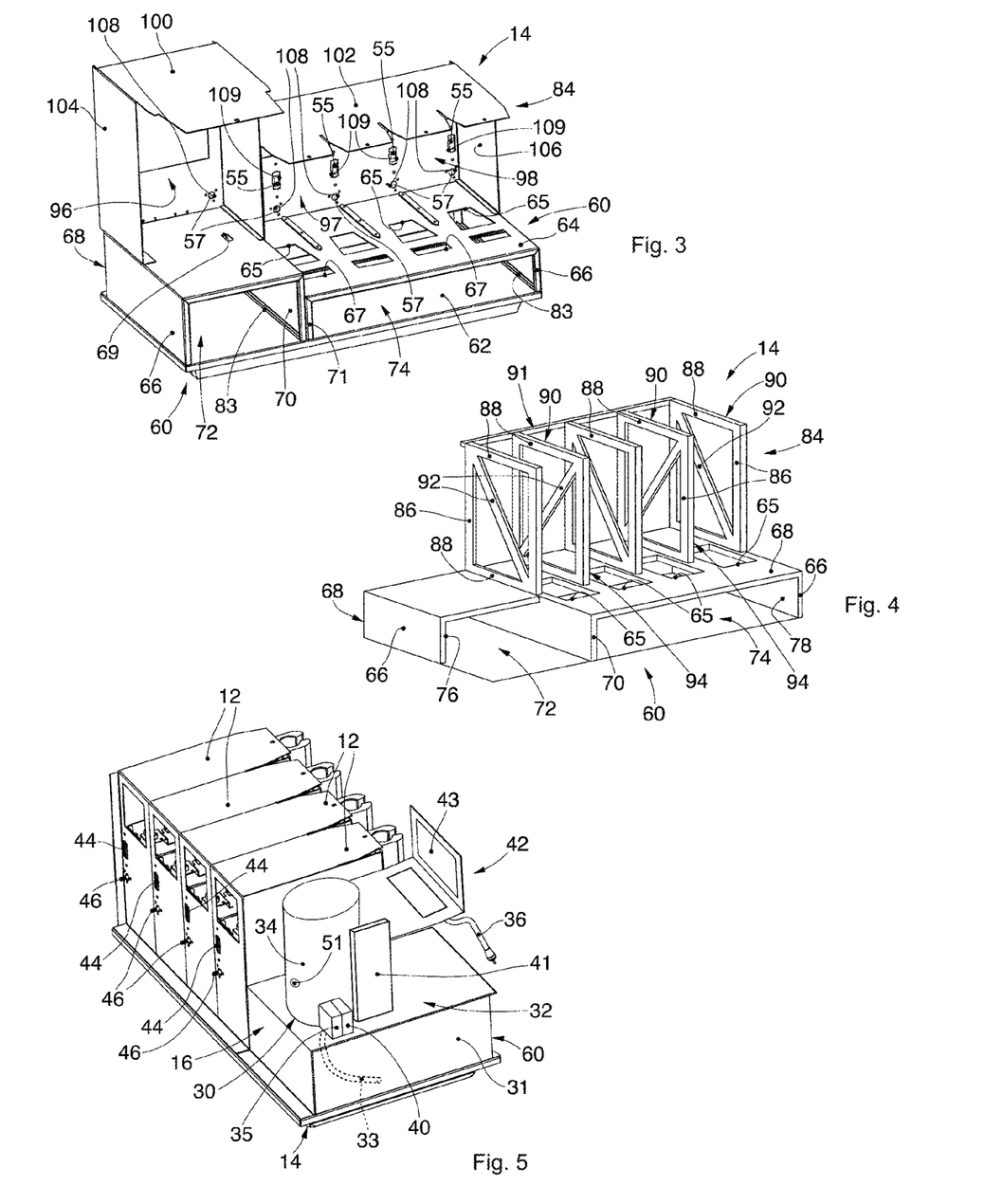
FIG. 3 is a perspective view of a frame of a modular machine for preparing beverages from capsules in accordance with embodiments described here.
FIG. 4 is a perspective view of a frame of a modular machine for preparing beverages from capsules in accordance with other embodiments described here.
FIG. 5 is a perspective view of the inside of a modular machine for preparing beverages from capsules in accordance with embodiments described here.

According to embodiments described using FIG. 5, in which some parts of the frame 14 have been omitted for ease of comprehension, the unit to supply electric and hydraulic services 16 comprises a water feed unit 30, configured to supply water to each module 12 for the automatic preparation of beverages from capsules. According to some embodiments, the water feed unit 30 can supply the modules 12 for the automatic preparation of beverages from capsules with water at room temperature, which can then be heated to a suitable temperature by means of the heating block 25 present in the modules 12 for the automatic preparation of beverages from capsules.

According to some embodiments, the water feed unit 30 can comprise a water supply, usable to produce the coffee or other beverage, for example a container containing water 31.

According to embodiments described using FIG. 5, the water feed unit 30 can also comprise a pump for the water 35, configured to suck up the water contained in the water tank 31 and supply it to the hydraulic circuit 20.

The water pump 35 can be for example an immersion, or semi-immersion pump, disposed inside the water tank 31.

According to a variant, the water pump 35 can be a suction pump, and be disposed outside the water tank 31.

According to embodiments described using FIG. 5, the water feed unit 30 can provide a syphon tube 33 disposed inside the water tank 31 and connected to the water pump 35.

According to embodiments described using FIG. 5, the unit to supply electric and hydraulic services 16 can also comprise a water/steam unit 32, configured to supply hot water and/or steam, for example to prepare tea or other beverages that need water at temperatures near boiling.

According to some embodiments the electric circuit 18 and the hydraulic circuit 20 also feed the water/steam unit 32.

The water/steam unit 32 can comprise a water heating device 34, for example a boiler to heat the water supplied by the hydraulic circuit 20 to temperatures near the boiling point of water.

According to embodiments described using FIGS. 1 and 5, the water/steam unit 32 can also comprise a steam lance 36, connected to the water heating device 34, to supply steam at exit to the modular machine 10. The steam lance 36 can be for example a thermostated steam lance, or a normal steam lance.

According to embodiments described using FIG. 1, the water/steam unit 32 also comprises a hot water deliverer 38, configured to supply hot water at exit to the modular machine 10.

According to some embodiments, the unit to supply electric and hydraulic services 16 also comprises a device to feed electric energy 40. The electric energy feed device 40 can be for example a connection with an electric energy network, or can comprise one or more batteries or other electric energy accumulation systems.

According to embodiments described using FIG. 4, the unit to supply electric and hydraulic services 16 also comprises a control unit or system controller 41, configured to control and regulate at least the functioning of the unit to supply electric and hydraulic services 16. The control unit 41 can be any data processing system, a controller, microcontroller, processor or microprocessor usable in the field of control, automation or management of a group of operations.

According to embodiments described using FIG. 2, the unit to supply electric and hydraulic services 16 comprises a single outlet electric connector 50 configured to supply electric energy at exit to the unit to supply electric and hydraulic services 16 and to feed all the modules 12 for the automatic preparation of beverages from capsules.

According to some embodiments, a single feed entrance can be provided of the device to feed electric energy 40, and one or more circuits to manage the feed of electric energy to the unit to supply electric and hydraulic services 16 and to the electric circuit 18.

According to some embodiments, a first circuit can be provided, for example, to manage the feed of electric energy to the components of the unit to supply electric and hydraulic services 16, and a second circuit, different from the first circuit, but both powered by the device to feed electric energy 40, to manage the feed of the electric circuit 18 by means of the outlet electric connector 50.

According to a variant, a single circuit can be provided, or a single board that performs both the functions of feeding energy to the components of the unit to supply electric and hydraulic services 16, for example the water feed unit 30 and/or the water/steam unit 32, and to feed energy to the circuit 18 by means of the outlet electric connector 50.

According to embodiments described using FIG. 2, the unit to supply electric and hydraulic services 16 comprises an outlet hydraulic collector 52, for example a battery of outlet hydraulic sockets, connected to the water feed unit 30 to supply water at exit to the unit to supply electric and hydraulic services 16.

According to embodiments described using FIG. 2, the unit to supply electric and hydraulic services 16 can also comprise an inlet hydraulic socket 51 to feed the water heating device 34.

According to embodiments described using FIGS. 2 and 6, each module 12 for the automatic preparation of beverages from capsules comprises an inlet electric connector 44, configured for connection by means of the electric circuit 18 to the outlet electric connector 50 of the unit to supply electric and hydraulic services 16.

Each module 12 for the automatic preparation of beverages from capsules can also comprise an inlet hydraulic socket 46 for connection, by means of the hydraulic circuit 20, to the outlet hydraulic collector 52 of the unit to supply electric and hydraulic services 16.

According to embodiments described using FIG. 2, the electric circuit 18 can comprise a number of electric connections 54 at least equal to the number of modules 12 for the automatic preparation of beverages from capsules present in the modular machine 10, so that each electric connection 54 connects a module 12 for the automatic preparation of beverages from capsules to the unit to supply electric and hydraulic services 16.

According to some embodiments, each electric connection 54 can comprise a plurality of electric wires, to allow electric power to the modules 12 for the automatic preparation of beverages from capsules.

According to a variant of some embodiments, the electric wires can also be configured to transfer data from the unit to supply electric and hydraulic services 16 to the modules 12 for the automatic preparation of beverages from capsules and vice versa. In particular, therefore, the electric circuit 18 can be configured for the transmission and reception of data between the unit to supply electric and hydraulic services 16 and the modules 12 for the automatic preparation of beverages from capsules; in particular it is possible to put the control unit 41 in data communication with each of the modules 12 for the automatic preparation of beverages from capsules.

According to some embodiments, each electric connection 54 has at each end an electric connector 55, configured to connect on one side with an inlet electric connector 44 of a module 12 for the automatic preparation of beverages from capsules, and on the other side with the outlet electric connector 50 of the unit to supply electric and hydraulic services 16. Advantageously, the single frame 14 supports and positions the electric connectors 55.

According to embodiments described using FIG. 2, the hydraulic circuit 20 can comprise hydraulic connections 56, that is, tubes, pipes or suchlike. In particular, the hydraulic circuit 20 can include a number of hydraulic connections 56 at least equal to the number of modules 12 for the automatic preparation of beverages from capsules present in the modular machine 10, so that each hydraulic connection 56 connects one module 12 for the automatic preparation of beverages from capsules to the unit to supply electric and hydraulic services 16.

According to embodiments described using FIG. 2, a hydraulic connection 56 can also be provided between the water feed unit 30 and the water heating device 34.

According to some embodiments, each hydraulic connection 56 has a hydraulic socket 57 at each end, configured to connect on one side to an inlet hydraulic socket 46 of a module 12, and on the other side to an outlet hydraulic collector 52 of the unit to supply electric and hydraulic services 16. Advantageously, the single frame 14 supports and positions the hydraulic sockets 57.

Since the modules 12 for the automatic preparation of beverages from capsules are directly connected to the unit to supply electric and hydraulic services 16, each module 12 for the automatic preparation of beverages from capsules is independent hydraulically, electrically and mechanically from the other modules 12 for the automatic preparation of beverages from capsules.

In this way, even if one module 12 for the automatic preparation of beverages from capsules does not function correctly, the other modules 12 for the automatic preparation of beverages from capsules will continue to be available, and consequently it will be possible to prepare at least the types of beverages corresponding to the type of capsules contained in each of the capsule feed tanks 24 of the other modules 12 for the automatic preparation of beverages from capsules.

Furthermore, this also advantageously allows to disconnect or connect a module 12 for the automatic preparation of beverages from capsules simply and quickly, for example to replace it in the event of a malfunction, without interrupting the functioning of the modular machine 10.

Since it does not itself have its own electric and hydraulic feed, each module 12 for the automatic preparation of beverages from capsules can operate normally and prepare a beverage when it is connected by the electric circuit 18 and the hydraulic circuit 20 to the unit to supply electric and hydraulic services 16 and is fed by the latter with electric energy and the water needed to extract a beverage from a capsule.

According to embodiments described using FIGS. 1 and 5, and combinable with all the embodiments described here, the unit to supply electric and hydraulic services 16 can comprise a user interface 42 provided with a display device 43, a screen or display, on which information regarding the instructions for use of the modular machine 10 can be displayed, and/or the types of beverages available, and/or the state of progress of the preparation of a beverage and/or setting or alarm information.

According to embodiments described using FIGS. 3 and 4, the frame 14 is configured to support and house both the unit to supply electric and hydraulic services 16 and also the modules 12 for the automatic preparation of beverages from capsules.

The frame 14 can comprise a base 60 on which the unit to supply electric and hydraulic services 16 and the modules 12 for the automatic preparation of beverages from capsules can be disposed.

The base 60 can have a box-like shape, and be enclosed on five sides by a base 62, an upper wall 64, lateral walls 66 and a rear wall 68.

An intermediate transverse wall 70 can also be provided, configured to divide the base 60 so as to define two containing compartments 72, 74, each having a respective front aperture 76, 78.

According to embodiments described using FIG. 3, a second intermediate transverse wall 71 can be provided, adjacent to the intermediate transverse wall 70, to define containing compartments 72, 74 with a different height. In particular, the containing compartment 72 can have a bigger height than that of the containing compartment 74.

According to a variant of embodiments described using FIG. 4, the containing compartments 72, 74 can have the same height.

According to embodiments described using FIGS. 1 and 3, drawers 80, 82 can be provided, to selectively close the front apertures 76 and 78 respectively.

According to embodiments described using FIG. 3, sliding guides 83 can be provided, configured to facilitate the translation of the drawers 80, 82 as they open and close in direction F of FIG. 1.

According to some embodiments, the drawer 80, disposed inside the containing compartment 72, can be configured to house the water tank 31.

According to embodiments described using FIGS. 1 and 3, the drawer 82 can be disposed inside the containing compartment 74 and be configured to receive the used capsules arriving from the capsule discharge tanks 28 of each of the modules 12 for the automatic preparation of beverages from capsules.

According to some embodiments, the upper wall 64 can be provided with through apertures 65, which are each disposed during use in correspondence with the capsule discharge tank 28 of a module 12 for the automatic preparation of beverages from capsules, so that the used capsules pass from the discharge tanks 28 to the drawer 82.

This allows to eliminate simultaneously a plurality of used capsules simply by removing the drawer 82 and emptying it.

According to embodiments described using FIG. 3, the upper wall 64 can also comprise through apertures 67 located in correspondence with the access portion of each module 12 for the automatic preparation of beverages from capsules and configured to allow the passage of possible drops of beverage or water due to the delivery of a beverage.

According to some embodiments, the upper wall 64 can also comprise a through aperture 69 disposed in correspondence with the water tank 31.

According to some embodiments, a support structure 84 can be provided on the base 60, configured to house at least the modules 12 for the automatic preparation of beverages from capsules.

According to embodiments described using FIG. 3, the support structure 84 can comprise two containing compartments 96, 98 configured to receive and at least partly surround respectively the unit to supply electric and hydraulic services 16 and the modules 12 for the automatic preparation of beverages from capsules.

The containing compartments 96, 98 comprise respectively an upper wall 100, 102 and lateral walls 104, 106. According to possible embodiments, the containing compartments 96, 98 can share the rear wall 68. According to a possible variant, each containing compartment 96, 98 is defined by its own rear wall.

The frame 14 can also comprise dividing elements 95 with a longitudinal extension parallel to the operating direction F and attached on the rear wall 64 of the base 60 to define housing seatings 97 in which each of the modules 12 for the automatic preparation of beverages from capsules is inserted.

According to some embodiments, therefore, the frame 14 positions and supports both the hydraulic sockets 57, and also the electric connectors 55 by means of which it is possible to connect, hydraulically and electrically and removably, each of the modules 12 for the automatic preparation of beverages from capsules, autonomously with respect to each other, respectively to the hydraulic circuit 20 and the electric circuit 18, in particular by means of connection with the inlet hydraulic sockets 46 of the modules 12 for the automatic preparation of beverages from capsules and the inlet hydraulic socket 51 of the unit to supply electric and hydraulic services 16 and with the inlet electric connectors 44 of the modules 12 for the automatic preparation of beverages from capsules.

In this way, although the modules 12 for the automatic preparation of beverages from capsules are in themselves without electric and hydraulic feed, they can be fed hydraulically and electrically, once connected to the hydraulic circuit 20 and the electric circuit 18, autonomously with respect to the other modules 12 for the automatic preparation of beverages from capsules, so that, even in the case of malfunctioning, or removal for maintenance, replacement or repair, of one of the modules 12 for the automatic preparation of beverages from capsules, the hydraulic and electric operations of the other modules 12 for the automatic preparation of beverages from capsules are not compromised or interrupted, and the modular machine 10 can continue to operate with the remaining modules 12 for the automatic preparation of beverages from capsules.

To this purpose, according to embodiments described using FIG. 3, the frame 14 has hydraulic connection apertures 108 configured to position in particular the hydraulic sockets 57 of the hydraulic circuit 20 which cooperate with the inlet hydraulic sockets 46 of the modules 12 for the automatic preparation of beverages from capsules and the inlet hydraulic socket 51 of the unit to supply electric and hydraulic services 16. In particular, the rear wall 68 has a plurality of said through apertures 108, configured to connect the inlet hydraulic sockets 51 and 46 and located in correspondence with the containing compartment 96 and in correspondence with every housing seating 97 of the containing compartment 98.

Furthermore, according to embodiments described using FIG. 3, the frame 14 has electric connection apertures 109 configured to position in particular the electric connectors 55 of the electric circuit 18 which cooperate with the inlet electric connectors 44 of the modules 12 for the automatic preparation of beverages from capsules. In particular, the rear wall 68 has a plurality of through apertures 109 configured to connect the outlet electric connector 50 and the inlet electric connectors 44, located in correspondence with the containing compartment 96 and in correspondence with every housing seating 97 of the containing compartment 98.

According to embodiments described using FIG. 3, the rear wall 68 in correspondence with the containing compartment 96 can also comprise another through aperture 108 to connect the hydraulic collector 52.

According to a variant, described using FIG. 4, the support structure 84 can comprise uprights 86, disposed equally distanced on two opposite rows, and cross pieces 88 configured to connect respective opposite pairs of uprights 86, in particular in correspondence with the lower and upper ends of the latter.

In this way frames 90 can be defined, disposed transversely, each comprising two opposite uprights 86 and two cross pieces 88, parallel to each other.

Longitudinal elements 91 can also be provided, which connect in a longitudinal direction uprights 86 disposed along a row.

Diagonal elements 92 can also be provided, disposed so as to connect opposite corners of the frames 90.

The uprights 86 and cross pieces 88 thus disposed define housing compartments 94 each configured to house one module 12 for the automatic preparation of beverages from capsules, so that the modules 12 for the automatic preparation of beverages from capsules are disposed in order one after another in the direction of alignment F.

According to embodiments described using FIG. 4, the diagonal elements 92 and the frames 90 can function as dividers between two adjacent modules 12 for the automatic preparation of beverages from capsules.

In this way, if a single module 12 for the automatic preparation of beverages from capsules malfunctions, it is simple to remove only the module not functioning correctly, so that it can be repaired, quickly returning the modular machine 10 to use.

In order to make the assembly of the modular machine 10 and also the possible removal of one module 12 for the automatic preparation of beverages from capsules simple and quick, the inlet electric connectors 44 of the modules 12 for the automatic preparation of beverages from capsules can be rapid connectors, complementary to the electric connectors 55 of the electric circuit 18.

According to some embodiments, combinable with all the embodiments described here, the inlet hydraulic sockets 46 of the modules 12 for the automatic preparation of beverages from capsules and the inlet hydraulic socket 51 of the unit to supply electric and hydraulic services 16 can advantageously be hydraulic sockets of the rapid type, complementary to the hydraulic sockets 57 of the hydraulic circuit 20.

According to embodiments described using FIG. 7, and combinable with all the embodiments described here, the inlet electric connectors 44 can be rapid connectors of the male type with n-poles, which can easily be coupled with electric connectors 55 of the female type simply by exerting a pressure one against the other.

According to some embodiments, combinable with all the embodiments described here, the inlet hydraulic sockets 46, 51 can be rapid attachment connectors, for example hydraulic joints, rapid couplings with a valve, ball, flat face or screw.

According to embodiments described using FIG. 8, the inlet hydraulic sockets 46 can be male type connectors, which can easily be coupled with hydraulic sockets 57 of the female type simply by exerting a pressure one against the other.

According to some embodiments, combinable with all the embodiments described here, the outlet electric connector 50 and the outlet hydraulic collector 52 can also be rapid attachment connectors.

According to some embodiments, the inlet hydraulic sockets 46, 51 and the hydraulic sockets 57 can be non-drip, rapid disconnection connectors. For example, the inlet hydraulic sockets 46, 51 and the hydraulic sockets 57 can be quick disconnect zero spillage connectors, which are provided for example with a double closing valve, which at the moment of mechanical disconnection interrupts the respective hydraulic circuits, preventing the unwanted leakage of liquid.

According to some embodiments, the outlet hydraulic collector 57 can also be the quick disconnect zero spillage type.

According to a possible variant, not shown in the drawings, it is possible to provide that the electric circuit 18 comprises sliding contact conductor tracks, such as for example conduction tracks, fed by the outlet collector 50 and disposed in a suitable zone of the frame 14, to which the modules 12 for the automatic preparation of beverages from capsules can be connected, and by which they can be fed.

According to some embodiments, not shown in the drawings, it can be provided that the hydraulic circuit 20 comprises multi-way pipes disposed in the frame 14 to supply water to the individual modules 12, by respective branches of a pipe of the hydraulic circuit 20 fed by the outlet collector 52.

It is clear that modifications and/or additions of parts may be made to the modular machine 10 as described heretofore, without departing from the field and scope of the present invention.

For example, in possible embodiments, the modular machine 10 can include a refrigeration unit module to preserve milk and to feed it to a cappuccino maker.

The cappuccino maker can be for example the type with a Venturi system, or a gear pump.

In possible implementations, the refrigeration unit module and the corresponding cappuccino maker can be combined in line with the modules 12 for the automatic preparation of beverages from capsules, for example disposed between one module 12 and another, or between one module 12 and the unit to supply electric and hydraulic services 16, or again at the head of the modular machine 10, adjacent to the unit to supply electric and hydraulic services 16, or at the end of the modular machine 10, adjacent to the last module 12.

In still other possible implementations, the refrigeration unit module and the corresponding cappuccino maker can be integrated for example with the unit to supply electric and hydraulic services 16.

It is also clear that, although the present invention has been described with reference to some specific examples, a person of skill in the art shall certainly be able to achieve many other equivalent forms of modular machine, having the characteristics as set forth in the claims and hence all coming within the field of protection defined thereby.

In the following claims, the sole purpose of the references in brackets is to facilitate reading: they must not be considered as restrictive factors with regard to the field of protection claimed in the specific claims.

The invention claimed is:

1. A modular machine for preparing beverages from capsules, said machine comprising:
   a unit to supply electric and hydraulic services;
   a plurality of modules for automatic preparation of beverages from capsules, each of the plurality of modules being identical and having no electric feed and no hydraulic feed, each of the plurality of modules being removably connected to an electric circuit and to a hydraulic circuit, each of the electric and hydraulic circuits is in turn being connected to a single outlet electric connector and to an outlet hydraulic collector of said unit to supply electric and hydraulic services so that each module is electrically and hydraulically connected to said unit to supply electric and hydraulic services, each module being electrically and hydraulically autonomous with respect to every other module of the plurality of modules.

2. The modular machine as in claim 1, comprising a single frame that positions said unit to supply electric and hydraulic services and at least one of said modules, disposed adjacent to each other in a direction of alignment transverse to an operating direction, along which said modules are accessible.

3. The modular machine as in claim 2, wherein said frame comprises a base on which are disposed the unit to supply electric and hydraulic services and the one or more modules and an intermediate transverse wall that divides said base, defining two containing compartments each having a respective front aperture.

4. The modular machine as in claim 3, wherein said machine comprises drawers associated to said front apertures.

5. The modular machine as in claim 3, wherein said frame comprises a support structure disposed on said base provided with housing compartments configured to house and at least partly envelop respectively said unit to supply electric and hydraulic services and said modules.

6. The modular machine as in claim 3, wherein said frame comprises a support structure disposed on said base provided with upright elements and transverse elements connected to each other to define housing compartments configured to each house a module for the automatic preparation of beverages from capsules.

7. The modular machine as in claim 2, wherein said electric circuit and said hydraulic circuit are at least partly supported by said single frame.

8. The modular machine as in claim 2, wherein said single frame supports and positions electric connectors that electrically connect said unit to supply the electric services.

9. The modular machine as in claim 2, wherein said single frame supports and positions said hydraulic sockets.

10. The modular machine as in claim 1, wherein each of said one or more modules comprises an inlet electric connector able to be connected to said single outlet electric connector by means of said electric circuit and an inlet hydraulic socket able to be connected to said outlet hydraulic collector by means of said hydraulic circuit.

11. The modular machine as in claim 10, said electric circuit comprising a number of electric connections at least equal to the number of modules, so that each electric connection connects one of said modules to said unit to supply electric and hydraulic services, and
wherein each of said electric connections has an electric connector at each end, configured to connect on one side to an inlet electric connector of a module for the automatic preparation of beverages from capsules, and on the other side to said single outlet electric connector of the unit to supply electric and hydraulic services.

12. The modular machine as in claim 11, wherein said inlet electric connectors, said single outlet electric connector and said electric connectors are electric connectors of the rapid type.

13. The modular machine as in claim 1, wherein each of said plurality of modules comprises a capsule feed tank, a beverage delivery unit and a discharge tank to receive the used capsules.

14. The modular machine as in claim 13, including a base, and wherein said base-comprises an upper wall provided with through apertures that, during use, are each disposed in correspondence to the discharge tank of each one of said modules.

15. The modular machine as in claim 1, wherein said unit to supply electric and hydraulic services comprises:
   a device to feed electric energy configured to supply electric power to each of said modules by means of said electric circuit,
   a unit to feed water configured to supply water to each of said modules by means of said hydraulic circuit.

16. The modular machine as in claim 15, wherein said unit to feed water comprises a water tank configured to contain a supply of water, and a pump for the water configured to suck up the water contained in said water tank and supply it to said hydraulic circuit.

17. The modular machine as in claim 1, wherein said unit to supply electric and hydraulic services comprises a water/steam unit configured to supply to a user at least one of hot water or steam.

18. The modular machine as in claim 17, wherein said water/steam unit comprises a water heating device configured to heat the water supplied by said hydraulic circuit up to temperatures near that of boiling water.

19. The modular machine as in claim 1, wherein said unit to supply electric and hydraulic services comprises a control unit.

20. The modular machine as in claim 19, wherein said electric circuit is configured for the communication of data between said control unit and said modules for the automatic preparation of beverages from capsules.

21. The modular machine as in claim 1, including hydraulic connections for providing the hydraulic services, and wherein each of said hydraulic connections has a hydraulic socket at each end, configured to connect on one side to an inlet hydraulic socket of a module for the automatic preparation of beverages from capsules, or to an inlet hydraulic connector of the unit to supply electric and hydraulic services, and on the other side to said outlet hydraulic collector of the unit to supply electric and hydraulic services.

22. The modular machine as in claim 21, wherein said outlet hydraulic collector, said inlet hydraulic sockets and said hydraulic sockets are hydraulic sockets of the rapid type.

23. The modular machine as in claim 1, wherein said electric circuit is configured for the transmission and reception of data between the unit to supply electric and hydraulic services and the modules for the automatic preparation of beverages from capsules.

24. The modular machine as in claim 1, wherein said unit to supply electric and hydraulic services comprises a user interface provided with a display device able to display at least one of information regarding the instructions for use of the modular machine, the type of beverage available, the state of progress of the preparation of a beverage, setting information, or alarm information.

25. The modular machine as in claim 1, wherein said electric circuit comprises a number of electric connections at least equal to the number of modules, so that each electric connection connects one of said modules to said unit to supply electric and hydraulic services.

26. The modular machine as in claim 1, wherein said hydraulic circuit comprises a number of hydraulic connections at least equal to the number of modules so that each hydraulic connection connects one of said modules for the automatic preparation of beverages from capsules to said unit to supply electric and hydraulic services.

27. The modular machine as in claim 1, wherein said machine comprises a cover configured to contain at least said unit to supply electric and hydraulic services and said modules for the automatic preparation of beverages from capsules.

28. The modular machine as in claim 1, wherein said machine comprises a refrigeration unit module to preserve milk and to feed the milk to a cappuccino maker.

29. The modular machine as in claim 1, wherein said automatically prepared beverages include espresso coffee.

30. A method of making a modular machine for preparing beverages from capsules, the method comprising:
  supplying a unit to supply electric and hydraulic services;
  supplying a plurality of modules for automatic preparation of beverages from capsules, the modules being identical to each other, each of the plurality of modules having no electric feed and no hydraulic feed;
  removably connecting each module to an electric circuit and a hydraulic circuit connected respectively to a single outlet electric connector and to an outlet hydraulic collector of said unit to supply electric and hydraulic services so that each module is electrically and hydraulically connected to said unit to supply electric and hydraulic services, each module being electrically and hydraulically autonomous with respect to every other module of the plurality of modules.

* * * * *